May 25, 1926.
W. N. MOORE
CYLINDER BORING MACHINE
Filed Oct. 27, 1924 2 Sheets-Sheet 1
1,586,378
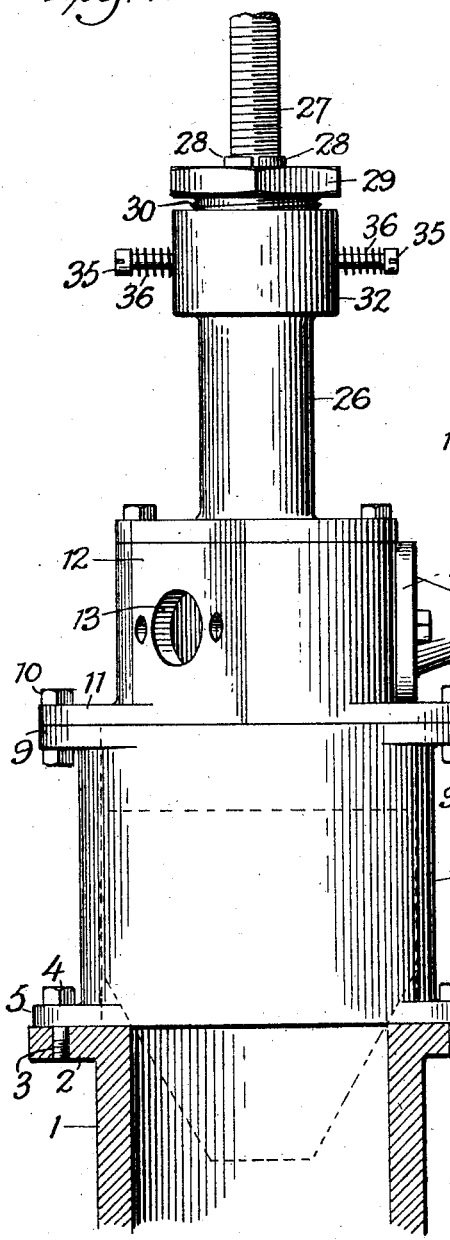
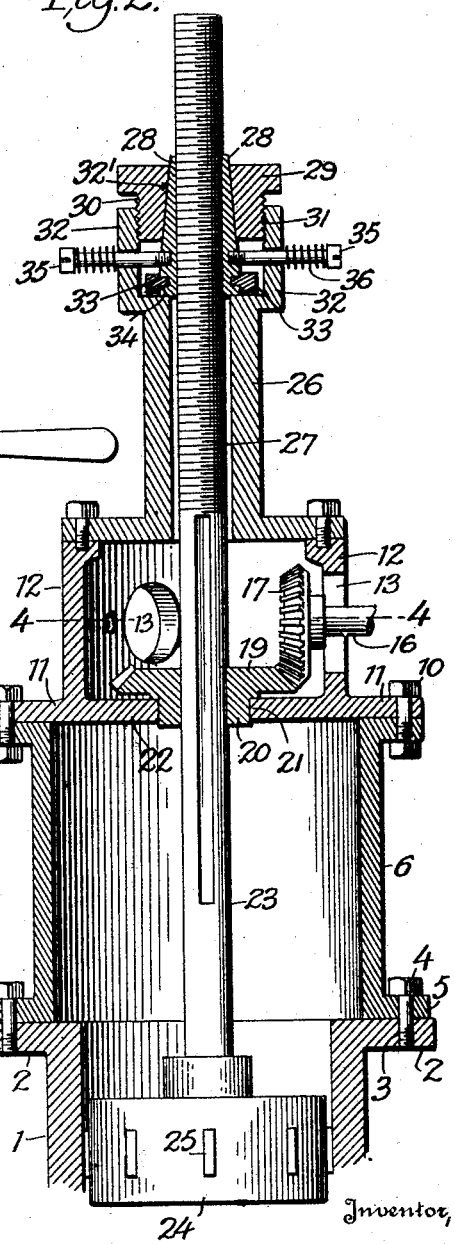
Inventor,
William N. Moore, May 25, 1926.
W. N. MOORE
1,586,378
CYLINDER BORING MACHINE
Filed Oct. 27, 1924    2 Sheets-Sheet 2
Fig. 3.
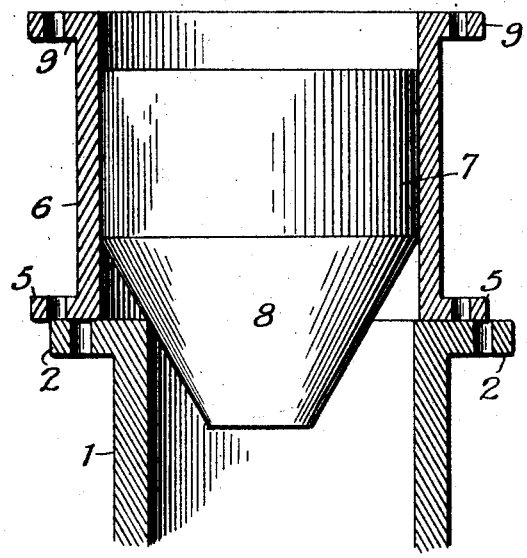
Fig. 4.
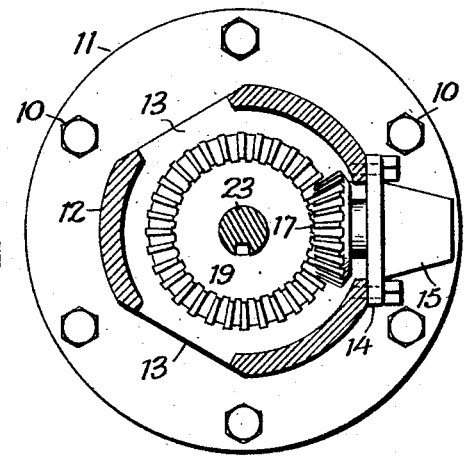
Fig. 5.
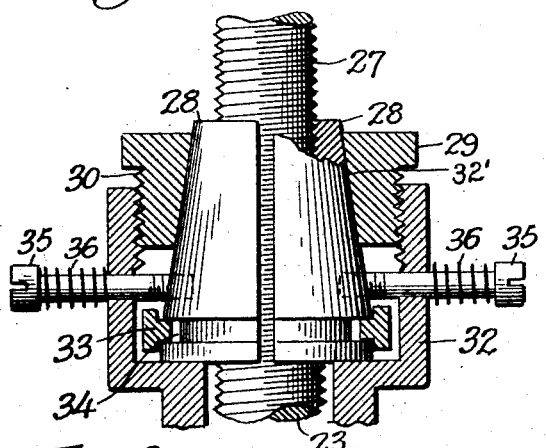
Fig. 7.
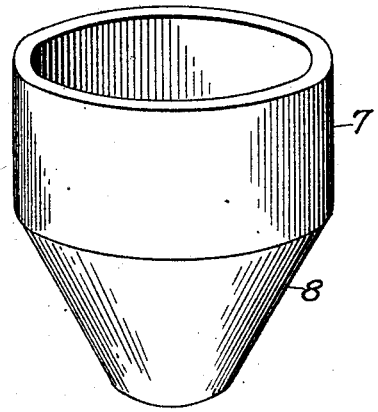
Fig. 6.
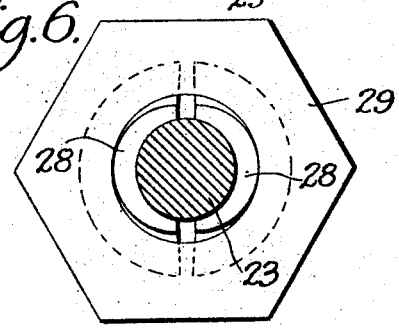
Inventor,
William N. Moore,
By
Attorney Patented May 25, 1926.

1,586,378

UNITED STATES PATENT OFFICE.

WILLIAM N. MOORE, OF WASHINGTON, DISTRICT OF COLUMBIA.

CYLINDER-BORING MACHINE.

Application filed October 27, 1924. Serial No. 746,201.

My invention relates to improvements in cylinder boring machines, which while particularly adapted and designed for boring the cylinders of automobile or motor engines, may be used for boring any character of cylindrical surfaces where the machine would operate effectively and practically.

One object of my invention is the provision of a machine which can be instantly clamped or secured to the head or block and which will quickly bore the surface of the cylinder with perfect accuracy and without damaging the surface in any manner.

Another object of my invention is the provision of a machine which can be quickly guided or centered to place the boring implement in the exact center to insure a perfect boring of the surface of the cylinder.

Another object of my invention is the provision of a machine which will operate by hand and which will drill or bore the cylinder with perfect accuracy in about fifteen minutes, thus proving a great saver of time as well as insuring excellent service.

Another object of my invention is the provision of a machine which will be of small and compact size to take up little space; which will be composed of few parts to insure simplicity, durability and cheapness of production; which will be easy to attach and operate and which will prove thoroughly practical in every particular.

With these objects in view my invention consists of a cylinder boring machine embodying novel features of construction and combination of parts for service, substantially as described and defined by the claims, and as shown in the accompanying drawings, in which:

Figure 1 represents a side elevation of a cylinder boring machine constructed in accordance with my invention in position upon the cylinder, which is shown in section, with the centering guide shown in dotted lines.

Figure 2 represents a vertical central sectional view thereof.

Figure 3 represents a view in side elevation of the centering guide or member, with the cylinder and base member of my machine, to show the manner of operation of the guide and its relation to the base member and cylinder.

Figure 4 represents a sectional view on line 4—4 of Figure 2.

Figures 5 and 6 are detail views of the screw shaft of the boring machine and the cooperating elements, and Figure 7 represents a perspective view of the guiding or centering member.

Referring by numeral to the drawings in which the same numerals denote like parts in all the views:

The numeral 1 designates a portion of the cylinder of an automobile engine which is to be bored or resurfaced, and which is one of a series in the block or head, and which may be formed with the flange 2, having threaded openings 3, to receive the screws 4, which engage the ears 5, formed on the base of the cylindrical pedestal or supporting member 6, which is guided and centered by means of the guiding and centering element, shown in Figure 7, and consisting of the cylindrical band 7, adapted to fit snugly in the member 6, and having the depending cone shaped end 8, which fits in the cylinder, as shown in Figure 1, to insure proper centering, and when the center has been found the said guiding element is removed.

The supporting member 6, is formed at its upper edge with a flange 9, to which is fastened by bolts 10, the base flange 11, of the casing or housing 12, which is provided with a series of openings 13, in its vertical wall which permit the application of the bearing plate 14, of the horizontal shaft bearing cone 15, in which is mounted the shaft 16, carrying at its inner end the bevel pinion 17, and at its other end the crank 18, for handy turning of said shaft.

The turning by hand, of the shaft 16, revolves the vertical bevel pinion 17, which meshes with the horizontal bevel pinion 19, which has a depending journal 20, bearing in an opening 21, of the bottom 22, of the casing or housing 12, and said bevel pinion 19, is rigidly and vertically movably secured to the stem 23, which at its lower end carries the head 24, having mounted therein the drills or cutters 25, which bore or resurface the cylinder, as shown in Fig. 2.

From the foregoing it will be understood that the base supporting member 6, is first centered by the guiding element and then secured to the cylinder, the guide is then removed, and the casing carrying the working parts of the boring machine is then fastened upon the base or pedestal, and the turning of the shaft by hand revolves the stem with its cutters to effect the boring of the cylinder, and the said stem passes upward through the hollow column 26, being provided at or near its upper portion with threads 27, which engage the pair of conical shaped threaded jaws 28, which are forced into threaded mesh or engagement with the threaded stem by the clamping manually operated member 29, which is formed with the exterior threaded portion 30, which engages the threads 31, in the upper enlarged or chambered portion 32, of the vertical column, the member 29, having a conical bearing opening 32', to act against the conical jaws 28, as shown in Figures 2 and 5, and the said conical jaws being properly retained in place and allowed a play by the pair of segmental or curved plates 33, which fit in grooves 34, of the jaws, and by means of the pair of rods 35, cushioned by springs 36, all as clearly shown in Figures 2 and 5.

From the description taken in connection with the drawings the operation of my machine will be readily understood, and the guiding member is first dropped into the cylinder which is to be bored or resurfaced, and the exact center having been obtained, the base is secured to the cylinder, the guide removed and the boring machine is secured upon the supporting base or pedestal, and with the boring knives or cutters in contact with the surface of the cylinder, the stem is rotated by manually turning the shaft, and as the stem revolves it also by reason of the threaded jaws and the threaded portion of the stem a vertical travel is imparted to the stem and boring implement and a perfect boring or resurfacing of the cylinder is insured in a very short time, that is about fifteen minutes, thus providing a practical, efficient and highly desirable boring machine.

The important features of my invention reside in the centering means, the gear casing having the series of openings to receive the plate carrying the shaft with driving gear, and the feed mechanism shown in Fig. 5, which features I have found from experience are of vital importance and enable me to produce a practical machine of the highest efficiency.

I claim:

1. A cylinder boring machine, consisting of a supporting member adapted to be centered and secured upon the cylinder, a lower casing secured to said supporting member, a gear casing secured to said lower casing and provided with a series of openings, a column rising from said gear casing and having an upper enlarged portion, screw-threads on the inner edge of said enlarged portion, a jamb nut having threads to engage the threads on said inner edge of the enlarged portion and having a conical opening, a pair of wedge-shaped clamping jaws engaged by said conical opening and formed with interior threads and with an annular recess, a ring engaging said annular recess, a pair of spring-pressed rods connected to said jaws for moving them outwardly upon release of the jamb nut, a threaded stem engaged by said jaws, a cutting implement carried by said stem, a bevel pinion on said stem, a driving shaft carrying a bevel pinion meshing with the bevel pinion on the stem, a plate in which said driving shaft is mounted, said plate being capable of application to any one of the series of openings in the gear casing.

2. A cylinder boring machine, consisting of a supporting member adapted to be centered and secured upon the cylinder, a lower casing secured to said supporting member, a gear casing secured to said lower casing, a column rising from said gear casing and having at its upper end an enlarged portion, interior threads on the inner end of said large portion, a jamb nut having threads to engage the threads on the inner edge of the enlarged portion and having a conical opening, a pair of wedge-shaped clamping jaws engaged by said conical opening and formed with interior threads and with an exterior annular recess, a ring engaging said said annular recess, a pair of spring-pressed rods connected to said jaws for moving them outwardly upon release of the jamb nut, a threaded stem engaged by said jaws, a cutting implement carried by said stem, a bevel pinion on said stem, and a driving shaft carrying a bevel pinion meshing with the bevel pinion on the stem.

In testimony whereof I hereunto affix my signature.

WILLIAM N. MOORE.